US009501247B2

(12) United States Patent
Muroi

(10) Patent No.: US 9,501,247 B2
(45) Date of Patent: Nov. 22, 2016

(54) IMAGE FORMING APPARATUS, CONTROL METHOD AND A NON-TRANSITORY COMPUTER-READABLE STORAGE DEVICE HAVING CONTROL PROGRAM

(71) Applicant: Brother Kogyo Kabushiki Kaisha, Nagoya-shi, Aichi-ken (JP)

(72) Inventor: Kazushige Muroi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/792,738

(22) Filed: Jul. 7, 2015

(65) Prior Publication Data

US 2016/0011823 A1    Jan. 14, 2016

(30) Foreign Application Priority Data

Jul. 8, 2014   (JP) ................................. 2014-140338

(51) Int. Cl.
*G06F 3/12* (2006.01)
*H04N 1/00* (2006.01)
*G06K 15/02* (2006.01)

(52) U.S. Cl.
CPC ........... *G06F 3/1205* (2013.01); *G06F 3/1254* (2013.01); *G06F 3/1285* (2013.01); *G06K 15/1809* (2013.01); *H04N 1/00206* (2013.01); *H04N 2201/0094* (2013.01)

(58) Field of Classification Search
USPC ................... 358/3.28, 1.13, 1.14, 1.15, 1.16; 345/204; 382/162
See application file for complete search history.

(56) References Cited

U.S. PATENT DOCUMENTS

| | | | | |
|---|---|---|---|---|
| 8,884,936 B2* | 11/2014 | Maekawa | ........... | H04N 1/00411 345/204 |
| 8,913,269 B2* | 12/2014 | Taima | .................... | G06F 3/1234 358/1.13 |
| 2004/0135889 A1* | 7/2004 | Koizumi | ............ | H04N 1/00188 348/207.1 |
| 2009/0059296 A1* | 3/2009 | Kuwahara | ............ | H04N 1/0097 358/1.16 |
| 2009/0213413 A1* | 8/2009 | Ren | ......................... | G06T 11/60 358/1.15 |
| 2011/0188744 A1* | 8/2011 | Sun | ........................... | G06T 5/50 382/162 |
| 2013/0208296 A1* | 8/2013 | Yoshida | ................. | G06K 15/02 358/1.14 |
| 2015/0002873 A1* | 1/2015 | Kumagai | ........... | G06K 15/1852 358/1.13 |

FOREIGN PATENT DOCUMENTS

JP        2002-318671 A     10/2002

* cited by examiner

*Primary Examiner* — Jerome Grant, II
(74) *Attorney, Agent, or Firm* — Banner & Witcoff, Ltd.

(57) ABSTRACT

An image forming apparatus includes a data receiving device, a memory, an image forming device forming an image on a recording medium and a control device controlling the memory to store therein a data aggregate received by the data receiving device. The data aggregate includes image data relating to an image and condition data relating to an image forming condition for forming the image on the recording medium by the image forming device. The control device determines whether command data relating to a command to the image forming apparatus is included in the data aggregate stored in the memory and, when it is determined that the command data is included in the data aggregate stored in the memory, executes a command based on the command data, instead of image formation by the image forming condition relating to the condition data.

18 Claims, 6 Drawing Sheets

IMAGE FORMING APPARATUS, CONTROL METHOD AND A NON-TRANSITORY COMPUTER-READABLE STORAGE DEVICE HAVING CONTROL PROGRAM

CROSS-REFERENCE TO RELATED APPLICATION

This application claims priority from Japanese Patent Application No. 2014-140338 filed on Jul. 8, 2014, the entire subject-matter of which is incorporated herein by reference.

TECHNICAL FIELD

The disclosure relates to an image forming apparatus, a control method to be executed in the image forming apparatus, and a control program to be installed in a computer of the image forming apparatus.

BACKGROUND

For example, it has been known a cloud print of designating a printer on the Internet from an application installed in a client terminal such as a portable device, a personal computer (which will be abbreviated as PC) and the like and enabling the printer to print an image.

The cloud print is convenient in that it is not necessary to install a printer driver in the client terminal. On the other hand, the cloud print has a drawback in that it is unable to make a print setting and the like for using a distinctive function of a printer.

In a print system of which a user interface (which will be abbreviated as UI) is insufficient, in order to enable the print setting for using a function of the printer, a configuration has been suggested in which a print setting image corresponding to the print setting is added to an upper part of an image to be printed, and when the image is transmitted from a server to the client terminal, the print setting image is analyzed to obtain a print setting and an image is then printed based on the print setting.

SUMMARY

One illustrative aspect of the present disclosure may provide an image forming apparatus comprising: a data receiving device; a memory; an image forming device configured to form an image on a recording medium; and a control device configured to control the memory to store therein a data aggregate received by the data receiving device, wherein the data aggregate comprises: image data relating to an image; and condition data relating to an image forming condition for forming the image on the recording medium by the image forming device, wherein the control device is configured to: determine whether command data relating to a command to the image forming apparatus is included in the data aggregate stored in the memory; and when it is determined that the command data is included in the data aggregate stored in the memory, execute a command based on the command data, instead of image formation by the image forming condition relating to the condition data.

According thereto, when the data aggregate is received at the data receiving device, the data aggregate is stored in the memory. The data aggregate includes the image data relating to an image and the condition data relating to an image forming condition for forming an image by the image forming device. Also, the data aggregate may include the command data relating to the command to the image forming apparatus. In this case, the command based on the command data is executed, instead of the image formation by the printing condition relating to the condition data.

Incidentally, the present disclosure can be implemented not only as an aspect of the image forming apparatus but also as aspects of a control method in the image forming apparatus and a control program to be installed in a computer of the image forming apparatus.

According to the present disclosure, it is possible to improve the operability without adding a new operation function to the image forming apparatus.

DETAILED DESCRIPTION

In the related art, it is required to separate and analyze the print setting image from the image to be printed, and the analysis processing thereof is troublesome.

Also, for example, when an image similar to the print setting image is originally included in the image to be printed, the image similar to the print setting image may be separated from the image to be printed, and an image of which a part is omitted may be thus printed with an erroneous print setting.

Therefore, illustrative aspects of the present disclosure provide an image forming apparatus, a control method and a control program capable of improving operability without adding a new operation function to the image forming apparatus.

Hereinafter, an illustrative embodiment of the present disclosure will be described in detail with reference to the accompanying drawings.

<Outline of Printing System>

Figure 1:
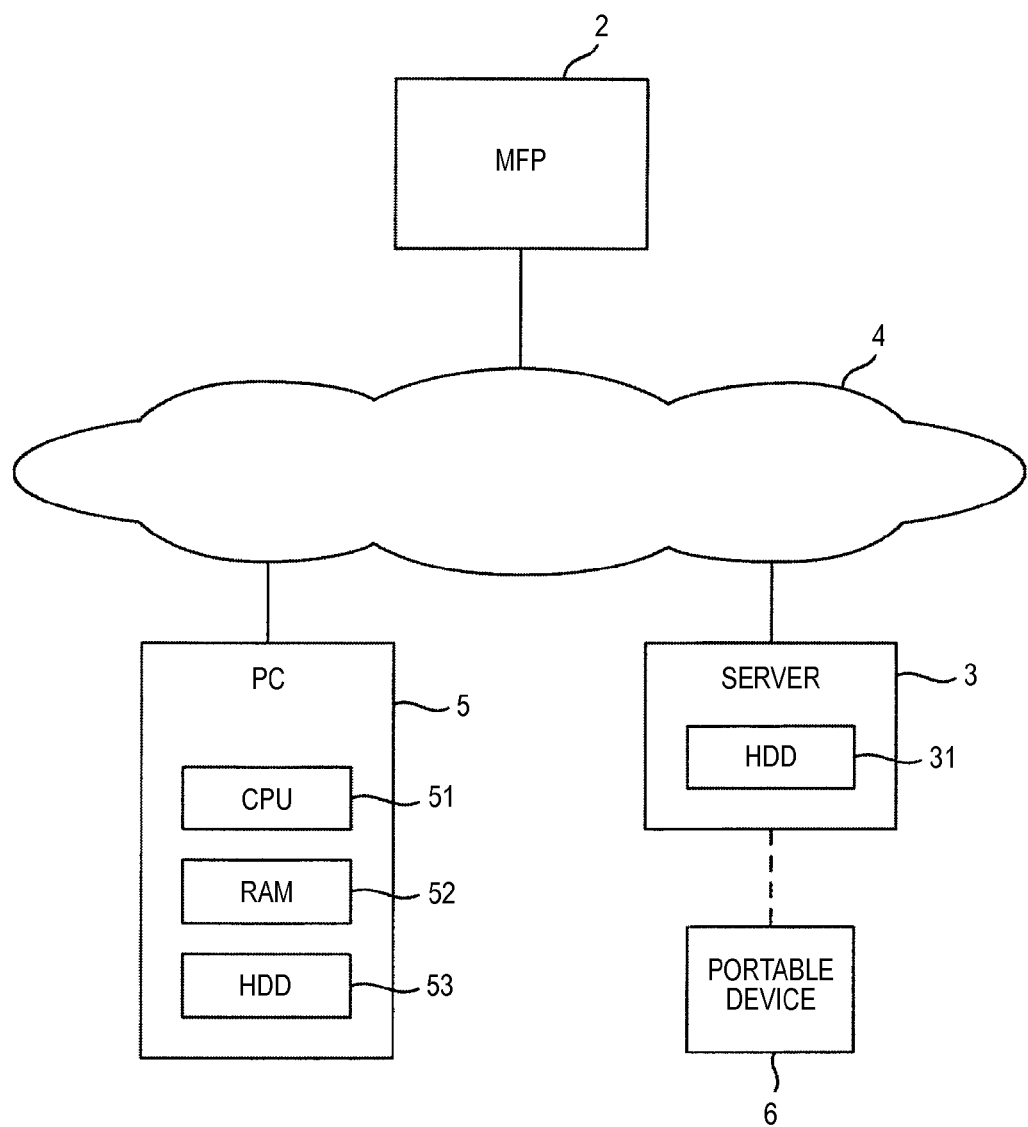
FIG. 1 is a block diagram showing a configuration of a printing system having an MFP included therein in accordance with an illustrative embodiment of the present disclosure.

As shown in FIG. 1, a printing system 1 includes a multi-function peripheral (which will be abbreviated as MFP) 2, which is an example of the image forming apparatus, a server 3 and a personal computer (which will be abbreviated as PC) 5. The MFP 2, the server 3 and the PC 5 are connected in communication with each other through the Internet 4, which is an example of the network. The PC 5 has a CPU 51, a RAM 52, and a hard disk drive (which will be abbreviated as HDD) 53.

The MFP 2 can be accessed from the PC 5 via the Internet 4. Also, the MFP 2 can be accessed from the PC 5 via a wired local area network (which will be abbreviated as LAN) or wireless LAN, without access through the Internet 4. The server 3 can be accessed from a portable device 6 such as a portable phone via a public switched telephone network or wireless LAN. The portable device 6 can access the server 3 via the public switched telephone network and Internet 4 or via the wireless LAN and Internet 4.

The server 3 has an HDD 31. The server 3 is configured to provide a download service of transmitting a file stored in the HDD 31 to the MFP 2 through the Internet 4.

When using the download service, a user accesses a web site, which is provided by the server 3, from the PC 5 or portable device 6. When the web site is accessed, a login screen is displayed on a display of the accessing PC 5 or portable device 6. When a user ID and a login password are input on the login screen, the authentication of the user ID and login password is performed in the server 3. When the authentication is successful, a list of printable files is displayed on the display of the accessing PC 5 or portable device 6. When one or more files are selected and execution thereof is instructed, a print job relating to the printing execution of the file is transmitted from the server 3 to the MFP 2. When the MFP 2 receives the print job, the printing of the file (image data) included in the print job is executed in the MFP 2. Incidentally, the above operations are just an example and can be appropriately changed.

Also, when the user performs the same operation as the above operation by on a touch panel 50 (refer to FIG. 3) of the MFP 2, it is possible to download a file from the server 3 to the MFP 2 and to print the same.

Also, the user can transmit a printing job from the PC 5 to the MFP 2 by operating the PC 5.

<Overall Configuration of MFP>

Figure 2:
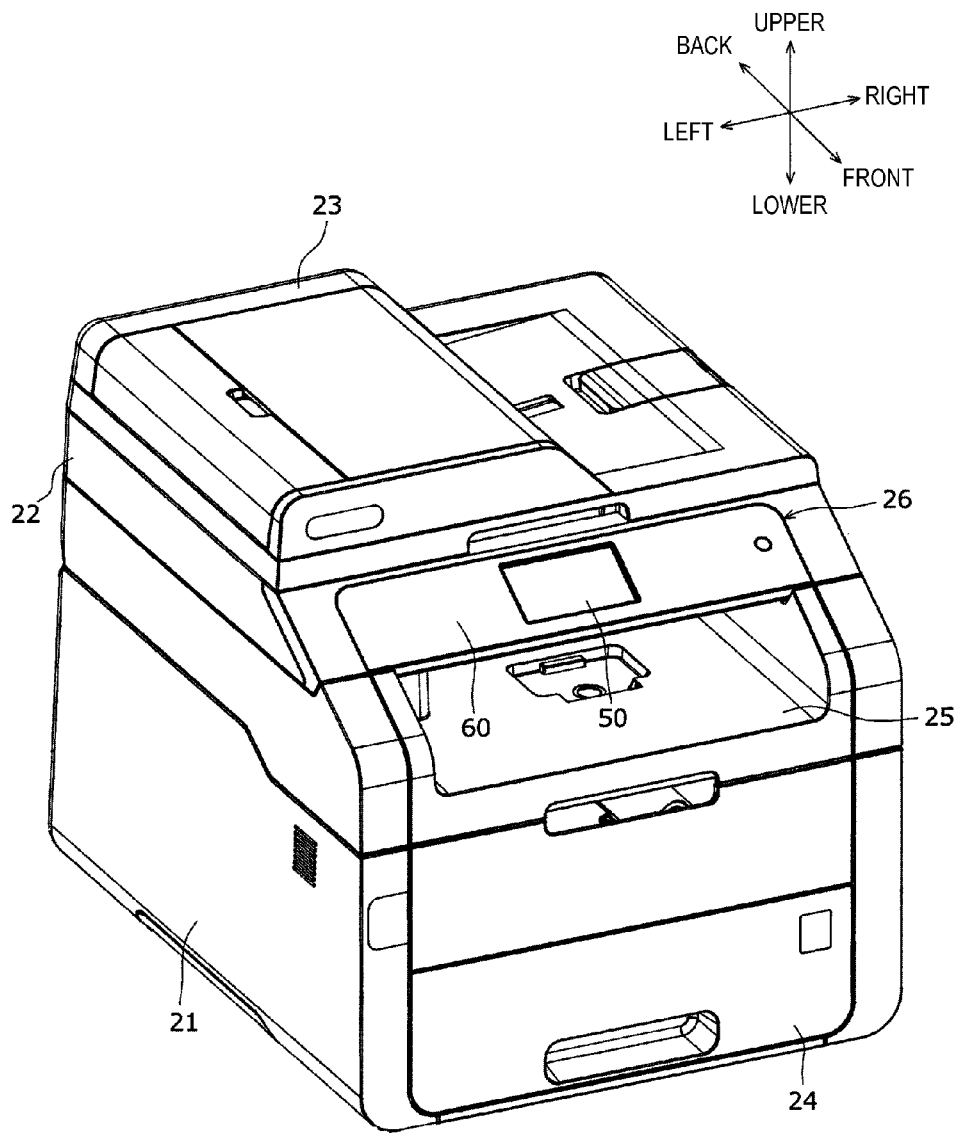
FIG. 2 is a perspective view of the MFP, as seen from a left, front and upper side.

As shown in FIG. 2, the MFP 2 has a printer main body 21, a scanner main body 22 and an auto document feeder (which will be abbreviated as ADF) 23.

Meanwhile, in the below descriptions, respective directions of upper, lower, left, right, front and back, which are defined when seeing the MFP 2 placed on a planar plane from a side on which an operation panel 26 (which will be described later) is provided, are used.

In the printer main body 21, an image forming device 30 (refer to FIG. 3) is accommodated. The image forming device 30 is a device configured to execute a printing operation (color or monochrome printing operation) based on image data and to form an image on a sheet. The image may be formed by an electrophotographic method or inkjet method.

The printer main body 21 is provided at its lowest part with a sheet feeding tray 24. The sheet feeding tray 24 is configured to stack and accommodate therein sheets, which are an example of a plurality of recording media. An upper surface of the printer main body 21 is formed with a sheet discharge tray 25. The sheets accommodated in the sheet feeding tray 24 are sent one by one from the sheet feeding tray 24 into the printer main body 21, which is then conveyed in the printer main body 21 towards the sheet discharge tray 25. While the sheet is conveyed in the printer main body 21, an image is formed on the sheet by the image forming device 30. The sheet having the sheet formed thereon is discharged to the sheet discharge tray 25.

The scanner main body 22 is arranged above the printer main body 21, and the ADF 23 is arranged above the scanner main body 22.

In the scanner main body 22, an image reading device 40 (refer to FIG. 3) is accommodated. The image reading device 40 is a device configured to read an image formed on a sheet from the sheet and to store the same in a RAM 103, as image data. The reading may be performed by an ADF method of reading a sheet image while conveying the sheet or a flat bed (which will be abbreviated as FB) method of placing a sheet on a contact glass and reading a sheet image.

Also, the MFP 2 has the operation panel 26. The operation panel 26 is arranged at a front end portion of the scanner main body 22, for example. The operation panel 26 is provided with the touch panel 50 and a near field communication (which will be abbreviated as NFC) interface 60 (hereinafter, referred to as NFC 60).

The touch panel 50 includes a liquid crystal indicator and a touch sensor, for example. On the touch panel 50, a variety of information is displayed. On the touch panel 50, a variety of inputs can be made by a touch operation on operation buttons displayed on the touch panel 50. The operation buttons include an OK button for confirming a variety of instructions (for example, an instruction to start a copy operation), a cancel button for cancelling various instructions, ten keys for inputting a number and a character, and the like.

The NFC 60 is configured to perform interactive wireless communication with a non-contact IC card such as an ID card.

<Electrical Configuration of MFP>

Figure 3:
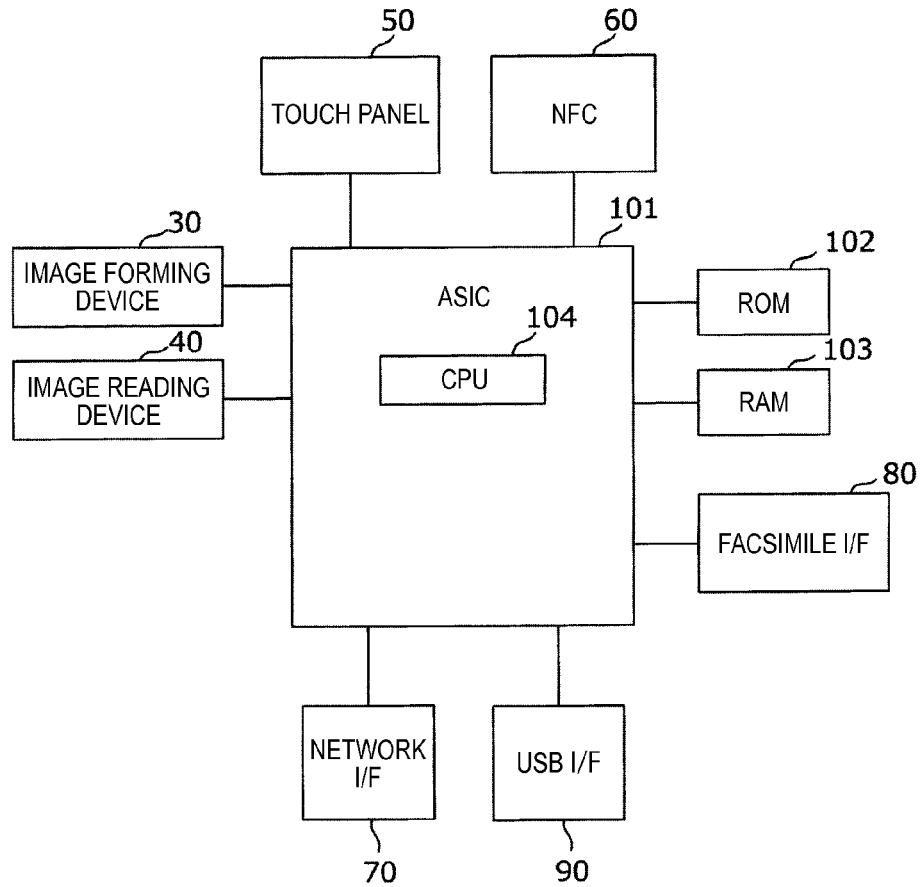
FIG. 3 is a block diagram showing an electrical configuration of the MFP.

As shown in FIG. 3, the MFP 2 has a network interface (which will be abbreviated as I/F) 70, a facsimile interface 80, a USB interface 90, an application specific integrated circuit (which will be abbreviated as ASIC) 101, a ROM 102, and a RAM 103, which is an example of the memory.

The network interface 70, which is an example of the data receiving device, is an interface for connection with a local area network (which will be abbreviated as LAN). The MFP 2 is connected to the Internet 4 (refer to FIG. 1) via the LAN.

The facsimile interface 80, which is an example of the facsimile communication device, is an interface for connection with a public switched telephone network that is used for facsimile communication.

The USB interface 90 is an interface (e.g., USB port) for connecting thereto a removable medium such as a USB memory. The MFP 2 has a direct printing function. The direct printing function is a function of fetching a file stored in the removable medium and printing the same.

The ASIC 101 is input with a signal indicating a content, which is input by operating the touch panel 50, and the like. Also, the ASIC 101 is input with a data aggregate 111 (refer to FIG. 4), which is transmitted from the server 3, the PC 5 and the like, through the network interface 70. Further, the data stored in the removable medium is fetched to the ASIC 101 through the USB interface 90.

The ASIC 101 has therein a CPU 104, which is an example of the control device. The CPU 104 is configured to execute programs for various processing on the basis of the data aggregate 111 input to the ASIC 101 and the like, thereby controlling the image forming device 30, the image reading device 40 and the touch panel 50 and also controlling the communication through the network interface 70 or facsimile interface 80.

In the ROM 102, the programs to be executed by the CPU 104 and a variety of data are stored.

The RAM 103 is used as a work area when the CPU 104 executes a program.

<Data Aggregate>

When the data aggregate 111 is received from the server 3, the PC 5 and the like, the MFP 2 forms (prints) an image by the image forming device 30.

The data aggregate 111 is a data file including a metadata area, and is a file prepared in accordance with a file format such as an EXIF (which is an abbreviation of EXchangeable Image File Format), a PDF (which is an abbreviation of Portable Document Format) and the like.

The EXIF is an image file format including a metadata area and corresponds to an image format such as JPEG (which is an abbreviation of Joint Photographic Experts Group), TIFF (which is an abbreviation of Tagged Image File Format) and the like.

Figure 4:
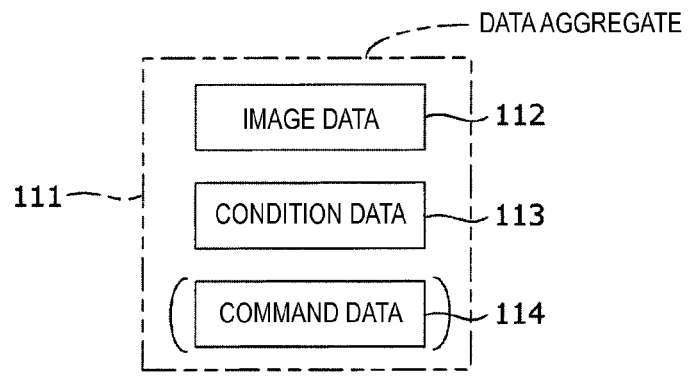
FIG. 4 is a concept view showing an example of a data aggregate.

As shown in FIG. 4, the data aggregate 111 includes at least image data 112 and condition data 113. Also, the data aggregate 111 may include command data 114, in some cases.

In the below, the data aggregate 111 is described by exemplifying an EXIF file corresponding to the JPEG format. Also, in the EXIF format, an area configured to store data except for the image data 112 is referred to as an EXIF area.

The image data 112 is image data of the JPEG format, for example.

The condition data 113 is data configured to store a printing condition to the MFP 2. The condition data 113 is stored in the EXIF area. The condition data 113 is data of a print setting that, when a file of the data aggregate 111 is prepared, is set by the printer driver and is stored in the file. The condition data 113 includes data of the number of sheets to be printed, data of a page to be printed, and data of a printing magnification, for example.

The data of the number of sheets to be printed is data for designating the number of sheets to be printed.

The data of a page to be printed is data for designating a page to be printed.

The data of a printing magnification is data for designating a printing magnification.

Figure 5:
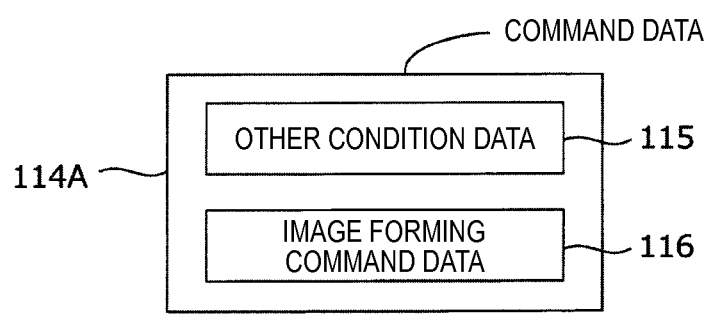
FIG. 5 is a concept view showing an example of command data.
Figure 6:
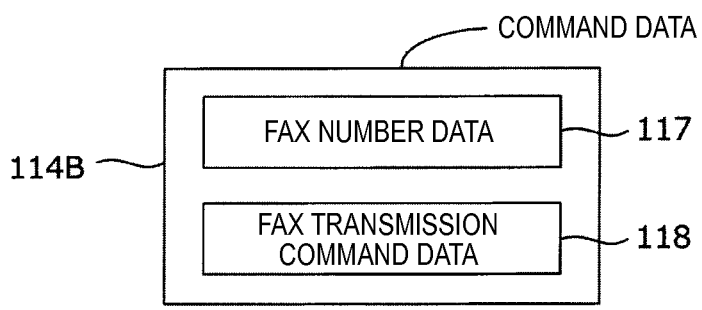
FIG. 6 is a concept view showing another example of the command data.

The command data 114 is data in which an operating command to the MFP 2 is stored. The command data 114 is stored in the EXIF area. The command data 114 may have a configuration of including other condition data 115, as shown in FIG. 5, or a configuration of not including the other condition data 115, as shown in FIG. 6. In the below, when it is necessary to distinguish the command data 114, the command data 114 having the configuration of including the other condition data 115 is referred to as 'command data 114A', and the command data 114 having the configuration of not including the other condition data 115 is referred to as 'command data 114B'. Incidentally, the EXIF area in which the command data 114 is stored and the EXIF area in which the condition data 113 is stored are logically or physically separated, so that the command data 114 and the condition data 113 can be clearly distinguished.

In the configuration of the command data 114A including the other condition data 115, the command data 114A includes the other condition data 115 and image forming command data 116, as shown in FIG. 5.

The other condition data 115 is data configured to store a printing condition to the MFP 2. The other condition data 115 includes a more specific printing condition than the printing condition included in the condition data 113, for example. The other condition data 115 includes monochrome/color setting data, image quality setting data, sheet setting data, aggregation setting data and duplex printing setting data, in addition to the number of sheets to be printed, a page to be printed and a printing magnification.

The monochrome/color setting data is data configured to store a setting selecting whether the printing is to be performed on the basis of monochrome printing or color printing.

The image quality setting data is data configured to store a setting selecting whether the printing is to be performed on the basis of a low image quality or a high image quality.

The sheet setting data is data configured to store a size of a printing sheet. The sheet setting data is configured to store size designating information such as A4 size, A3 size, B5 size and the like.

The aggregation setting data is data configured to store a setting for aggregating and printing a plurality of pages into one page. The aggregation setting data includes information indicating whether the aggregation printing is to be performed or not and the number of pages to be aggregated into one page.

The duplex printing setting data is data configured to store a setting indicating whether a duplex printing is to be performed.

The image forming command data 116 is data configured to store a command indicating that the printing is to be performed on the basis of the printing condition stored in the other condition data 115.

Meanwhile, in the configuration of the command data 114B not including the other condition data 115, the command data 114B includes data configured to store a command to the MFP 2 and data that is required when the MFP 2 executes the command.

In an example of the configuration of the command data 114B not including the other condition data 115, the command data 114B includes FAX number data 117 and FAX transmission command data 118, for example, as shown in FIG. 6.

The FAX number data 117 is data configured to store a FAX number.

The FAX transmission command data 118 is data configured to store a command to facsimile-transmit an image of the image data 112 to a destination, which is designated by the FAX number stored in the FAX number data 117.

Further, regarding the configuration of the command data 114B not including the other condition data 115, a configuration of including data configured to store a command of power supply ON to the MFP 2, and a configuration of including data configured to store a command of power supply OFF to the MFP 2 may be further exemplified.

<Upload Processing>

When a user wants to include the command data 114 in the data aggregate 111, the user activates an application program for command data setting for including the command data 114 in the data aggregate 111 on the PC 5, designates a printing target file on a displayed screen, and inputs a printing condition (corresponding to the other condition data 115) of the designated printing target file or a command to the MFP 2.

When designating the printing target file, the user designates a folder name, in which the printing target file is stored, and a file name with the application program for command data setting. In this case, the user can designate a printing target file preserved in another terminal connected to the PC 5 via the network.

Then, the user inputs a printing condition of the designated printing target file. The printing condition includes a number of sheets to be printed, a page to be printed, a printing magnification, a monochrome/color setting, an image quality setting, a sheet setting, an aggregation setting and a duplex printing setting. The printing condition is set separately from the printing condition (corresponding to the condition data 113), which is to be set later by a printer driver. The printing condition set by the application program for command data setting may include a more specific printing condition than the printing condition set by the printer driver. For example, the printing condition that is to be set by the printer driver includes only a basic printing setting such as a number of sheets to be printed, a page to be printed, a monochrome/color setting and the like.

Also, the user can input a command to the MFP 2 with the application program for command data setting, instead of the printing condition. The command to the MFP 2 is to command an operation of the MFP 2 irrelevant to the printing target file and the printing condition thereof. The command to the MFP 2 includes a command of power supply ON to the MFP 2, a command of power supply OFF, and a command of FAX transmission, for example. In the case of the command of FAX transmission, a facsimile number is also input, as data necessary for the command.

After inputting the printing target file and the printing condition or the command to the MFP 2 by the application program for command data setting, the user presses a setting execution displayed on the screen. The contents designated and input with the application program for command data setting are stored in a predetermined area of the RAM 52 with being associated with the printing target file. In other words, the data aggregate 111 including the command data 114 and not including the condition data 113 is stored in the predetermined area of the RAM 52.

The user activates an application program for upload for uploading the data aggregate 111 to the server 3, designates a printing target file on a displayed screen, and inputs a printing condition (corresponding to the condition data 113) of the designated printing target file. Here, the user may designate the printing target file associated with the command data 114 described above.

Also in this case, when designating the printing target file, the user designates a folder name, in which the printing target file is stored, and a file name with the application program for upload, for example. In this case, the user can designate a printing target file preserved in another terminal connected to the PC 5 via the network.

Then, the user inputs a printing condition (corresponding to the condition data 113) of the designated printing target file by a printer driver included in the application program for upload.

After inputting the printing target file and the printing condition with the application program for upload, the user presses an upload button displayed on the screen. Thereby, the data aggregate 111 is prepared and the prepared data aggregate 111 is uploaded to the server 3 by the application program for upload. Here, when the command data 114 is associated with the printing target file, the data aggregate 111 includes the image data 112, the condition data 113 and the command data 114, and when the command data 114 is not associated with the printing target file, the data aggregate 111 includes the image data 112 and the condition data 113 but does not include the command data 114.

Figure 7:
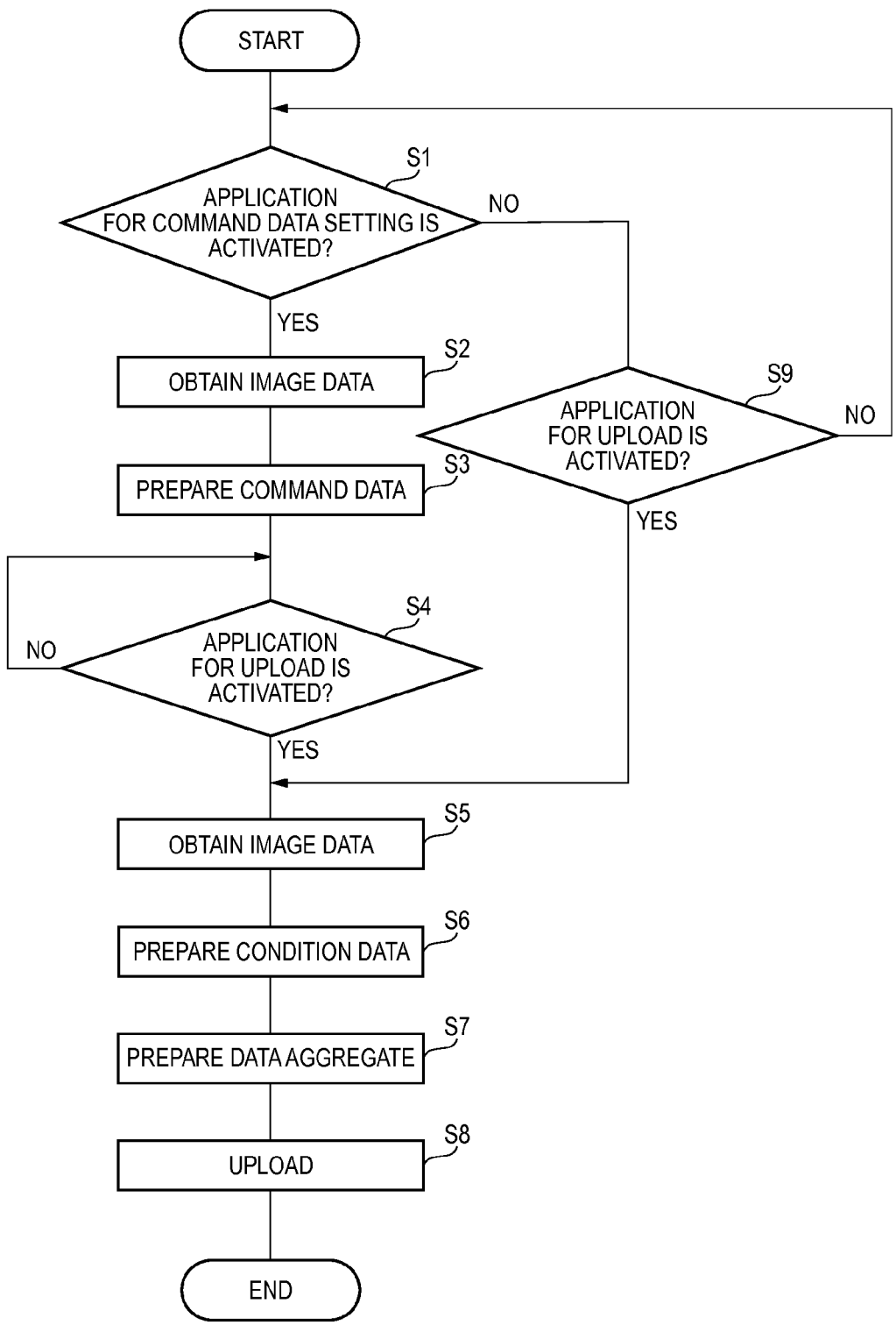
FIG. 7 is a flowchart showing a flow of setting processing and upload processing.

The processing shown in FIG. 7 is processing that is executed when uploading the data aggregate 111 to the server 3. The uploaded data aggregate 111 is preserved in the HDD 31 of the server 3.

First, the CPU 51 determines whether an application program (application for command data setting) for including the command data 114 in the data aggregate 111 is activated by the user (S1). When it is determined that the application for command data setting is activated by the user (S1: YES), the CPU 51 obtains, as the image data 112, the printing target file preserved in the HDD 53 from the folder name and file name designated by the user and stored in the predetermined area of the RAM 52 (S2). Then, the CPU 51 prepares the command data 114 corresponding to a command input by the user (S3). In this case, the command indicates both the printing condition input by the application program and the command to the MFP 2. The CPU 51 associates the prepared command data 114 with the earlier obtained printing target file and stores the same in the predetermined area of the RAM 52.

Specifically, when the command input by the user is the printing condition, the CPU 51 prepares the other condition data 115, which is the data of the printing condition, and the image forming command data 116, and prepares the command data 114A including the other condition data 115 and image forming command data 116. The printing condition of the other condition data 115 includes the more specific condition than the printing condition of the condition data 113.

Also, when the command input by the user is the command to the MFP 2, for example, if the facsimile number and the facsimile transmission command are included, the CPU 51 prepares the command data 114B including the FAX number data 117 and the FAX transmission command data 118.

Then, the CPU 51 determines whether the application program (application for upload) for uploading the data aggregate 111 to the server 3 is activated by the user (S4). When it is determined that the application for upload is activated by the user (S4: YES), the CPU 51 obtains, as the image data 112, the printing target file preserved in the HDD 53 from the folder name and file name designated by the user and stored in the predetermined area of the RAM 52 (S5). At this time, when the command data 114 prepared by the processing of the application for command data setting described above is associated with the obtained printing target file, the CPU 51 obtains the associated command data 114 from the predetermined area of the RAM 52, too. To the contrary, when the command data 114 is not associated with the obtained printing target file, the CPU 51 obtains only the printing target file.

Then, the CPU 51 prepares the condition data 113 corresponding to the obtained printing target file by the printing condition of the printing target file designated by the user, through the printer driver activating in accordance with the application for upload (S6).

Then, the CPU 51 prepares the data aggregate 111 including the image data 112 and the command data 114 (when the command data 114 is associated with the obtained printing target file) obtained in step S5 and the condition data 113 obtained in step S6 (S7).

Then, the CPU 51 uploads the prepared data aggregate 111 to the server 3 (S8).

When it is determined that the application for command data setting is not activated by the user (S1: NO), the CPU 51 determines whether the application program (application for upload) for uploading the data aggregate 111 to the server 3 is activated by the user (S9). When it is determined that the application for upload is activated by the user (S9: YES), the CPU 51 executes the processing of step S5 and thereafter. When it is determined that the application for upload is not activated by the user (S9: NO), the CPU 51 executes the processing of step S1 and thereafter.

<Data Receiving Processing>

Figure 8:
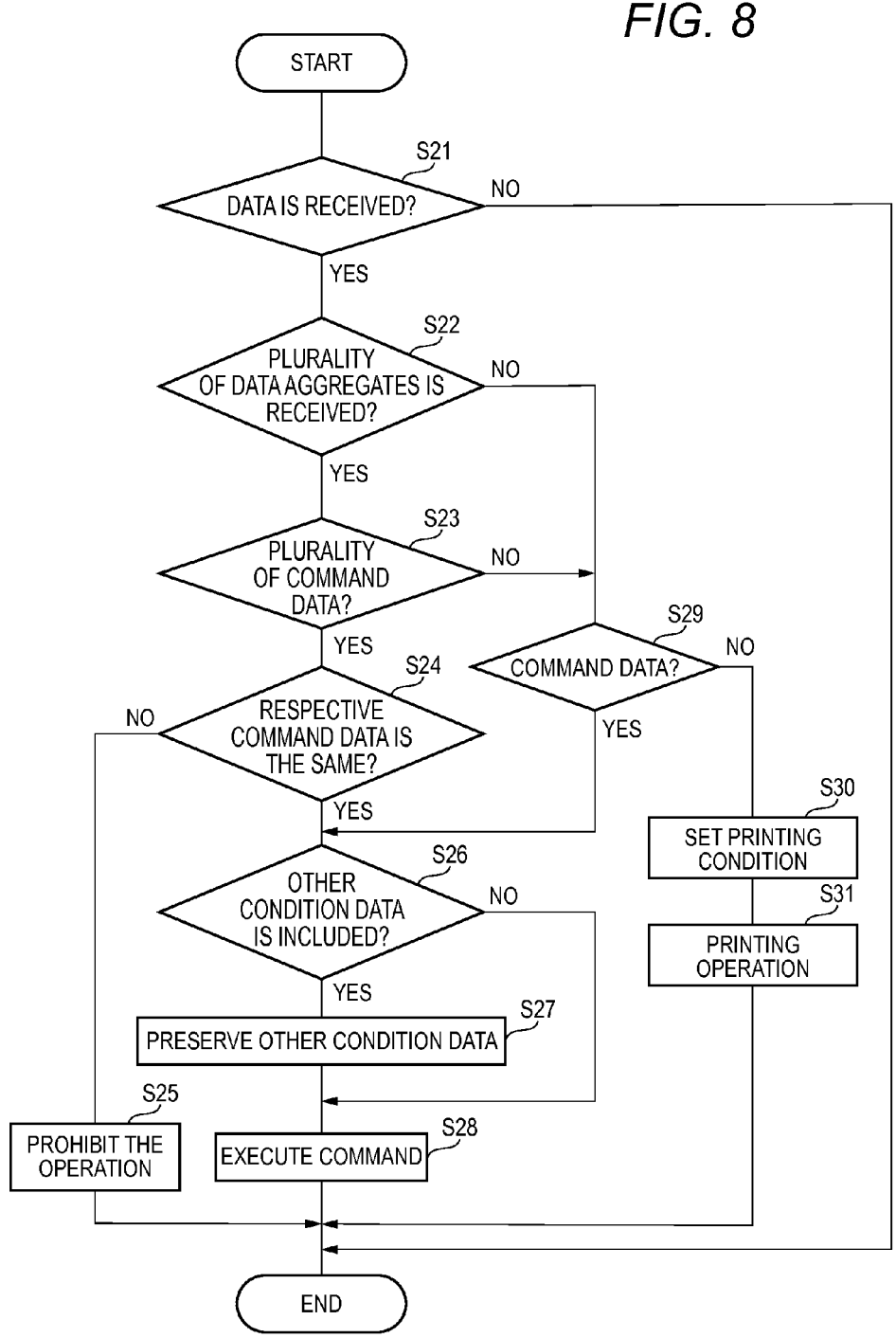
FIG. 8 is a flowchart showing a flow of data receiving processing.

While the power supply of the MFP 2 is ON, the CPU 104 of the ASIC 101 repeatedly executes data receiving processing shown in FIG. 8. The data receiving processing is processing that is executed when data is received at the MFP 2.

In the data receiving processing, the CPU 104 determines whether the data aggregate 111 relating to the printing is received from the server 3 (S21).

When the data aggregate 111 is not received (S21: NO), the CPU 104 ends the data receiving processing.

When the data aggregate 111 is received (S21: YES), the CPU 104 determines whether the received data aggregate 111 is plural (S22).

When the received data aggregate 111 is plural (S22: YES), the CPU 104 determines whether the data aggregate 111 including the command data 114 is plural in the plurality of received data aggregates 111 (S23).

When the data aggregate 111 including the command data 114 is plural (S23: YES), the CPU 104 determines whether the respective command data 114 thereof is the same (S24).

When the respective command data 114 is not the same (S24: NO), the CPU 104 prohibits the MFP 2 from performing the printing operation relating to the data aggregate 111 and the operation relating to the commands stored in the respective command data 114 (S25), and ends the data receiving processing.

When the respective command data 114 is the same (S24: YES), the CPU 104 determines whether the other condition data 115 is included in the command data 114 (S26).

When the other condition data 115 is included in the command data 114 (S26: YES), the CPU 104 stores the printing condition included in the other condition data 115 in the RAM 103 (S27). Then, the CPU 104 sets the printing condition to the image forming device 30 with the other condition data 115 stored in the RAM 103, and enables the image forming device 30 to execute the printing operation (S28). At this time, when the received data aggregate 111 is plural, the printing operation is executed for the image data 112 of all the received data aggregate 111.

When the other condition data 115 is not included in the command data 114 (S26: NO), the CPU 104 enables the MFP 2 to execute the command of the command data 114B (S28).

For example, when the FAX number data 117 and the FAX transmission command data 118 are included in the command data 114B, the CPU 104 facsimile-transmits the image data 112 of the received data aggregate 111 to the facsimile number stored in the FAX number data 117 by using the facsimile interface 80. When the received data aggregate 111 is plural, the CPU 104 facsimile-transmits the image data 112 of all the received data aggregate 111.

Also, for example, when the data of power supply OFF command is included in the command data 114B, the operation relating to the image data 112 is not executed, and the CPU 104 turns off the MFP 2.

On the other hand, when the received data aggregate 111 is one (S22: NO), and when the received data aggregate 111 is plural but the data aggregate 111 including the command data 114 is not plural (S23: NO), the CPU 104 determines whether the command data 114 is included in the received one or multiple data aggregates 111 (S29).

When the command data is included in the data aggregate 111 (S29: YES), the CPU 104 executes the processing of step S26 and thereafter.

On the other hand, when the command data 114 is not included in the received data aggregate 111 (S29: NO), if the printing condition is stored in the RAM 103 by the processing of step S27, the CPU 104 sets the printing condition to the image forming device 30, and if the printing condition is not stored, the CPU 104 sets the printing condition stored in the condition data 113 to the image forming device 30 (S30), and then the CPU 104 enables the image forming device 30 to execute the printing operation (S31).

<Operational Effects>

As describe above, when the data aggregate 111 is received at the MFP 2 through the network interface 70, the data aggregate 111 is stored in the RAM 103. The data aggregate 111 includes at least the image data 112 relating to an image and the condition data 113 relating to the printing condition (image forming condition) for forming an image by the image forming device 30. Also, the data aggregate 111 may include the command data 114 relating to the command to the MFP 2. In this case, the command based on the command data 114 is executed, instead of the image formation by the printing condition relating to the condition data 113.

For this reason, it is possible to remotely enable the MFP 2 to execute the command by including the command data 114 in the data aggregate 111. Therefore, it is possible to improve the convenience of the MFP 2 of the versatile printing system 1 such as a cloud print.

When the other condition data 115 relating to the printing condition different from the printing condition relating to the condition data 113 is included in the command data 114A and it is determined that the command data 114A is included in the data aggregate 111 stored in the RAM 103, the CPU 104 controls the image forming device 30 to form the image relating to the image data 112 included in the data aggregate 111 on a sheet with the printing condition relating to the other condition data 115.

Thereby, for example, in a universal driver having less functions than a dedicated driver, when the user cannot set a desired printing condition, it is possible to form an image on a sheet with the desired printing condition by including the other condition data 115 relating to the desired printing condition in the command data 114A. Therefore, it is possible to improve the convenience of the MFP 2.

When the plurality of data aggregates 111 is stored in the RAM 103 and the command data 114A including the other condition data 115 is included in one of the data aggregate 111, the CPU 104 controls the image forming device 30 to form the image relating to each of the image data 112 included in a respective one of the plurality of data aggregates 111 on a sheet with the printing condition relating to the other condition data 115.

Thereby, when the command data 114A including the other condition data 115 is included in one of the plurality of data aggregates 111 stored in the RAM 103, it is possible to form the image relating to each of the image data 112 included in the respective one of the plurality of data aggregates 111 with the printing condition relating to the other condition data 115. As a result, it is not necessary to include the command data 114A including the other condition data 115 in each of the plurality of data aggregates 111, so that it is possible to further improve the convenience.

When the command data 114A including the other condition data 115 different from each other is included in the plurality of data aggregates 111, the CPU 104 prohibits the image formation of the image forming device 30.

In this case, since there is a high possibility that the printing condition is erroneously set, the unnecessary image formation by the erroneously set printing condition is prohibited, so that it is possible to suppress the waste due to the unnecessary image formation.

When the other condition data 115 is included in the command data 114, the CPU 104 preserves the printing condition relating to the other condition data 115 in the RAM 103.

Thereby, since the printing condition relating to the other condition data 115 is preserved in the RAM 103, it is possible to use the printing condition preserved in the RAM 103 in the printing (image formation) that will be executed later. As a result, it is possible to omit the setting of the printing condition in the printing that will be executed later, so that it is possible to further improve the convenience.

When it is determined that the command data 114 is not included in the data aggregate 111 stored in the RAM 103, the CPU 104 controls the image forming device 30 to form the image relating to the image data 112 included in the data aggregate 111 on a sheet with the printing condition relating to the condition data 113.

Thereby, when the command data 114 is not included in the data aggregate 111, it is possible to form the image relating to the image data 112 included in the data aggregate 111 on a sheet with the printing condition relating to the condition data 113 included in the data aggregate 111.

The command data 114 may be data for commanding an operation except for the printing by the image forming device 30.

Thereby, it is possible to command the MFP 2 to execute an operation except for the printing by the image forming device 30 by including the command data 114B in the data aggregate 111.

For example, when the facsimile interface 80 for facsimile communication is further provided, the command data 114B is the FAX transmission command data 118 for commanding the facsimile interface 80 to perform the facsimile transmission and it is determined that the FAX number data 117 and the FAX transmission command data 118 are included in the command data 114B of the data aggregate 111 stored in the facsimile interface 80, the CPU 104 controls the facsimile interface 80 to facsimile-transmit the image data 112 included in the data aggregate 111.

Thereby, it is possible to command the MFP 2 to perform the facsimile transmission.

Modified Embodiments

Although the illustrative embodiment of the present disclosure has been described, the present disclosure can be implemented in other aspects.

For example, in the above illustrative embodiment, when the plurality of data aggregates 111 is received and the command data 114A including the other condition data 115 is included in one of the data aggregates 111, the CPU 104 controls the image forming device 30 to form the image relating to the image data 112 included in all the received data aggregates 111 including the one data aggregate 111 on a sheet with the printing condition relating to the other condition data 115. In this case, however, the image data 112 included in the one data aggregate 111 may not be used for printing, as dummy data, and the image relating to each of the image data 112 including in a respective one of the plurality of data aggregates 111 except for said one data aggregate 111 may be formed on a sheet.

Thereby, when the command data 114A including the other condition data 115 is included in one of the plurality of received data aggregates 111, the image relating to each of the image data 112 including in the respective one of the plurality of data aggregates 111 except for said one data aggregate 111 can be formed on a sheet with the printing condition relating to the other condition data 115. As a result, it is not necessary to include the command data 114A including the other condition data 115 in each of the plurality of data aggregates 111, so that it is possible to further improve the convenience.

Also, the present disclosure may be implemented by using the existing cloud server as the server 3 and the existing cloud print service provided by the server 3.

The file as the data aggregate 111 may not have the EXIF format inasmuch as it has a file format having a storage area of the metadata. For example, a file having a PDF format may be used as the data aggregate 111 and the command data 114 may be stored in a metadata area of the PDF file.

In the above illustrative embodiment, the data aggregate 111 is transmitted from the PC 5 to the MFP 2 via the server 3. However, the data aggregate 111 may be transmitted from the portable device 6 to the MFP 2.

Incidentally, the command data 114 is preferably preserved in a data area that is included in the data aggregate 111 and has a low possibility that data will be rewritten from the preparation of the command data 114 until the data aggregate is received at the MFP 2. For example, a comment area included in the metadata area of an image file has a low possibility that data recorded in the comment area will be rewritten. Therefore, when the command data 114 is preserved in the comment area, for example, it is possible to reduce concerns that the command data 114 will be damaged or lost, even though the application for command data setting, the application program for upload and the printer driver are provided by the other service providers.

Also, the above-described configurations can be variously design-changed within the scope defined in the claims.

What is claimed is:

1. An image forming apparatus comprising:
a data receiving device;
a memory storing a data aggregate received by the data receiving device;
an image forming device configured to form an image on a recording medium; and
a processor,
wherein the data aggregate is a data file including a metadata area and comprises:
image data relating to an image; and
condition data relating to an image forming condition for forming the image on the recording medium by the image forming device, the condition data being data of a print setting set by a printer driver, the condition data including data of the number of sheets to be printed and data of a page to be printed, the condition data being stored in the metadata area, and
wherein the memory stores computer readable instructions that, when executed by the processor, cause the image forming apparatus to:
determine whether command data is included in the data aggregate stored in the memory, the command data being data in which an operating command to the image forming apparatus is stored, the command data being stored in the metadata area of the data aggregate;
in a case where the command data is determined to be included in the data aggregate stored in the memory, execute a command based on the command data, instead of executing image formation by the image forming condition relating to the condition data; and
in a case where the command data is determined to not be included in the data aggregate stored in the memory, control the image forming device to form the image relating to the image data included in the data aggregate, on the recording medium with the image forming condition relating to the print setting set by the printer driver.

2. The image forming apparatus according to claim 1, wherein other condition data relating to the image forming condition, which is different from the image forming condition relating to the condition data, is included in the command data, and
wherein in the case that the command data is determined to be included in the data aggregate stored in the memory, execution of the instructions causes the image forming apparatus to control the image forming device to form the image relating to the image data included in the data aggregate on the recording medium with the image forming condition relating to said other condition data.

3. The image forming apparatus according to claim 2, wherein when a plurality of the data aggregates is stored in the memory and the command data including said other condition data is included in one of the plurality of data aggregates, execution of the instructions causes the image forming apparatus to control the image forming device to form the image relating to each of the image data included in a respective one of the plurality of data aggregates on the recording medium with the image forming condition relating to said other condition data.

4. The image forming apparatus according to claim 2, wherein when a plurality of the data aggregates is stored in the memory and the command data including said other condition data is included in one of the plurality of data aggregates, execution of the instructions causes the image forming apparatus to control the image forming device to form the image relating to each of the image data included in a respective one of the plurality of data aggregates except for said one data aggregate on the recording medium with the image forming condition relating to said other condition data.

5. The image forming apparatus according to claim 3, wherein when the command data including said other condition data different from each other is included in the plurality of data aggregates, execution of the instructions causes the image forming apparatus to prohibit image formation of the image forming device.

6. The image forming apparatus according to claim 1, wherein the command data comprises other condition data relating to an image forming condition different from the image forming condition relating to the condition data, and
wherein execution of the instructions causes the image forming apparatus to store the image forming condition relating to said other condition data in the memory.

7. The image forming apparatus according to claim 1, wherein the command data is data for commanding an operation other than the image formation by the image forming device.

8. The image forming apparatus according to claim 7, further comprising a facsimile communication device configured to perform facsimile communication,
wherein the command data is data for commanding the facsimile communication device to perform the facsimile communication, and
wherein in the case where the command data is determined to be included in the data aggregate stored in the memory, execution of the instructions causes the image forming apparatus to control the facsimile communication device to facsimile-transmit the image data included in the data aggregate.

9. The image forming apparatus according to claim 1, wherein the command data is data for commanding performance of communication, and
wherein in the case where the command data is determined to be included in the data aggregate stored in the memory, execution of the instructions causes the image forming apparatus to transmit the image data included in the data aggregate.

10. The image forming apparatus according to claim 1, wherein the condition data relates to a basic image forming condition including at least one of a number of sheets to be printed, a page to be printed and a printing magnification, the basic image forming condition being settable by an application program for command data setting at an user's device or a printer driver, and
wherein the command data comprises other condition data relating to a specific image forming condition, which is more specific than the basic image forming condition, the specific image forming condition including at least one of a monochrome/color setting, an image quality setting, a sheet setting, an aggregation setting and a duplex printing setting and being settable by the application program for command data setting.

11. A control method that is to be executed in an image forming apparatus comprising a data receiving device, a memory, and an image forming device configured to form an image on a recording medium, the method comprising:
controlling the memory to store therein a data aggregate received by the data receiving device, the data aggregate being a data file including a metadata area and comprising image data relating to an image and condition data relating to an image forming condition for forming the image on the recording medium by the image forming device, the condition data being data of a print setting set by a printer driver, the condition data including data of the number of sheets to be printed and data of a page to be printed, the condition data being stored in the metadata area;
determining that command data is not included in the data aggregate stored in the memory, the command data being data in which an operating command to the image forming apparatus is stored, the command data being stored in the metadata area of the data aggregate; and in a case where the command data is determined to not be included in the data aggregate stored in the memory, control the image forming device to form the image relating to the image data included in the data aggregate on the recording medium with the image forming condition relating to the condition data that is the print setting set by the printer driver.

12. The control method according to claim 11, wherein other condition data relating to the image forming condition, which is different from the image forming condition relating to the condition data, is included in the command data, and
wherein the method further comprises:
in a case where the command data is determined to be included in the data aggregate stored in the memory, controlling the image forming device to form the image relating to the image data included in the data aggregate on the recording medium with the image forming condition relating to said other condition data.

13. The control method according to claim 11, further comprising:

in the case where the command data is determined to not be included in the data aggregate stored in the memory, controlling the image forming device to form the image relating to the image data included in the data aggregate on the recording medium with the image forming condition relating to the condition data.

14. The control method according to claim 13,
wherein the command data is data for commanding performance of communication, and
wherein the method further comprises:
in a case where the command data is determined to be included in the data aggregate stored in the memory, transmitting the image data included in the data aggregate.

15. A non-transitory computer-readable storage medium having a control program stored thereon and readable by a computer of an image forming apparatus, the image forming apparatus comprising a data receiving device, a memory, and an image forming device configured to form an image on a recording medium, the control program, when executed by a processor of the computer, causes the computer to perform operations comprising:
controlling the memory to store therein a data aggregate received by the data receiving device, the data aggregate being a data file including a metadata area and comprising image data relating to an image and condition data relating to an image forming condition for forming the image on the recording medium by the image forming device, the condition data being data of a print setting set by a printer driver, the condition data including data of the number of sheets to be printed and data of a page to be printed, the condition data being stored in the metadata area;
determining whether command data is included in the data aggregate stored in the memory, the command data being data in which an operating command to the image forming apparatus is stored, the command data being stored in the metadata area of the data aggregate;
in a case where the command data is determined to be included in the data aggregate stored in the memory, executing a command based on the command data, instead of image formation by the image forming condition relating to the condition data; and
in a case where the command data is determined to not be included in the data aggregate stored in the memory, control the image forming device to form the image relating to the image data included in the data aggregate on the recording medium with the image forming condition relating to the condition data that is the print setting set by the printer driver.

16. The non-transitory computer-readable storage medium according to claim 15,
wherein other condition data relating to the image forming condition, which is different from the image forming condition relating to the condition data, is included in the command data, and
wherein in a case where the command data is determined to be included in the data aggregate stored in the memory, the operations comprise controlling the image forming device to form the image relating to the image data included in the data aggregate on the recording medium with the image forming condition relating to said other condition data.

17. The non-transitory computer-readable storage medium according to claim 15,
wherein in a case where the command data is determined to not be included in the data aggregate stored in the memory, the operations comprise controlling the image forming device to form the image relating to the image data included in the data aggregate on the recording medium with the image forming condition relating to the condition data.

18. The non-transitory computer-readable storage medium according to claim 15,
wherein the command data is data for commanding performance of communication, and
wherein in a case where the command data is determined to be included in the data aggregate stored in the memory, the operations comprise transmitting the image data included in the data aggregate.

* * * * *